United States Patent

Rikken et al.

Patent Number: 5,151,965
Date of Patent: Sep. 29, 1992

[54] DEVICE FOR DOUBLING THE FREQUENCY OF A LIGHT WAVE

[75] Inventors: Gerardus L. J. A. Rikken; Constance J. E. Seppen, both of Eindhoven, Netherlands

[73] Assignee: U.S. Philips Corp., New York, N.Y.

[21] Appl. No.: 638,881

[22] Filed: Jan. 8, 1991

[30] Foreign Application Priority Data

Jun. 20, 1990 [NL] Netherlands .................... 9001398

[51] Int. Cl.$^5$ .............................................. G02F 1/35
[52] U.S. Cl. .................................... 385/122; 359/332; 385/143
[58] Field of Search ............................ 307/425–430; 350/96.12, 96.15, 96.29, 96.30, 96.34; 385/122, 141, 143, 145; 359/326–332

[56] References Cited

U.S. PATENT DOCUMENTS

| | | | |
|---|---|---|---|
| 4,865,406 | 9/1989 | Khanarian et al. | 350/96.12 |
| 4,971,416 | 11/1990 | Khanarian et al. | 350/96.12 |
| 5,002,361 | 3/1991 | DeMartino et al. | 350/96.34 |
| 5,076,658 | 12/1991 | Hayden et al. | 385/122 X |

Primary Examiner—John D. Lee
Attorney, Agent, or Firm—William L. Botjer

[57] ABSTRACT

Device for doubling the frequency of a light wave, comprising a non-linear optical medium of an oriented synthetic resin composition for guiding a fundamental light wave, while forming a second harmonic wave, which medium is composed of a waveguide having a spatially periodic structure for phase matching. The oriented synthetic resin composition exhibits alternate regions having a mutually different second order (non-linear optical) susceptibility. Said structure can be manufactured in an efficient manner by exposing the synthetic resin composition to patterned radiation.

5 Claims, 2 Drawing Sheets

DEVICE FOR DOUBLING THE FREQUENCY OF A LIGHT WAVE

BACKGROUND OF THE INVENTION

The invention relates to a device for doubling the frequency of a light wave by using a non-linear optical medium of a synthetic resin composition to guide a fundamental light wave, while forming a second harmonic wave, said medium comprising a waveguide having a spatially periodic structure for phase matching.

The invention also relates to a method of manufacturing a device for doubling the frequency of a light wave, which device comprises a waveguide of a synthetic resin composition, said waveguide exhibiting a spatially periodic structure for phase matching.

The device according to the invention can be used, for example, in combination with a semiconductor laser light source which generates red light, as a compact blue light source for optical storage of information and for telecommunication. By virtue of the use of short-wavelength light the information density can be increased and the possibilities of writing and erasing information are increased as a result of the greater photon energy.

In devices for doubling the frequency of a light wave the problem arises that the non-linear optical medium has different refractive indices for the fundamental wave and the second harmonic wave, thereby increasingly bringing about phase differences between both waves when light is guided through the medium. Owing to destructive interference the intensity of blue light spacially oscillates between zero and a small value. A possible solution to this problem is the use of a birefringent material whose normal refractive index at one wavelength should be equal to the extraordinary refractive index at the other wavelength. Another solution which is known per se is the use of waveguides having spatially periodic structures. In the latter solution, the non-linear optical properties in alternating regions are selected such that in regions where the fundamental light wave and the second harmonic wave are out of phase no second harmonic light wave is generated so that no extinction takes place. It is even possible to change the non-linear optical properties in such regions in such a manner that the generated blue light is of the opposite phase, so that a further intensification of the blue light takes place.

In U.S. Pat. specification U.S. 4865406, a description is given of a device for doubling the frequency of a light wave, in which the spatially periodic structure consists of regions having alternate directions of orientation of non-linear optical groups in a synthetic resin composition. In particular, FIG. 2b in that patent shows a structure in which regions having molecules which are oriented unidirectionally are alternated with regions having unoriented molecules. Frequency doubling takes place in the oriented regions. The unoriented regions not exhibiting non-linear optical behaviour and in which no frequency doubling takes place are located at those areas where the blue intensity would have decreased in a homogeneously aligned medium. In the subsequent oriented regions the generated blue light is intensified further. The alternate orientation in the polymer layer is obtained by alternating electric fields, for which purpose an electrode structure has to be provided on the polymer layer, having dimensions which correspond to those of the oriented regions, in practice of the order of 1 to 10 $\mu$m. However, the manufacture of such electrodes, for example by means of photolithography, is very time consuming and the spatial modulation of the non-linearity that can be achieved in this way is not complete, due to fringing fields.

SUMMARY OF THE INVENTION

It is an object of the invention to provide, inter alia, a device for doubling the frequency of a light wave, on the basis of a synthetic resin composition, such that the use of electrodes or other means of providing the molecules in adjacent regions with different orientations can be omitted. A further object of the invention is to provide a device by means of which red light can be converted into blue light in an efficient manner and with a high yield. Another object of the invention is to provide a simple and efficient method of manufacturing such a device.

According to the invention this object is achieved by a device and method as described in the opening paragraph, the waveguide being formed from a uniformly oriented synthetic resin composition in which alternately areas having a mutually different second order susceptibility are present in accordance with the desired spatially periodic structure. Regions having a higher susceptibility are alternated with regions having a lower susceptibility, which in the latter regions is preferably substantially zero. The second order susceptibility $chi^{(2)}$ or (first) non-linear optical susceptibility is the property which determines the degree of frequency doubling.

According to the invention, the object of providing a method of manufacturing such a device is achieved by a method as described in the opening paragraph, in which the waveguide is formed from a uniformly oriented synthetic resin composition having a non-linear optical component which, in accordance with the desired spatially periodic structure, is locally modified such that the second order susceptibility is changed.

According to a particularly simple and suitable embodiment of the method according to the invention, the local modification is obtained by means of patterned irradiation. It is efficacious to irradiate with light having a wavelength in the absorption band of the non-linear optical component in the synthetic resin composition.

For another purpose, in particular for the manufacture of waveguide channels, it is known per se to change the optical properties (refractive index) of non-linear optical materials by means of patterned irradiation, see the article by M. B. J. Diemeer et. al. in Electronics Letters 26 (6), pages 379 and 380 (1990).

BRIEF DESCRIPTION OF THE DRAWING

The invention will be explained in more by means of an exemplary embodiment and the accompanying drawing, in which FIG. 1 diagrammatically shows an embodiment of the device according to the method, FIG. 4 shows the refractive index n as a function of the wavelength $\lambda$ before and after the irradiation of a non-linear optical synthetic resin composition, and in which

DETAILED DESCRIPTION OF THE PREFERRED EMBODIMENT

Exemplary embodiment

Figure 1:
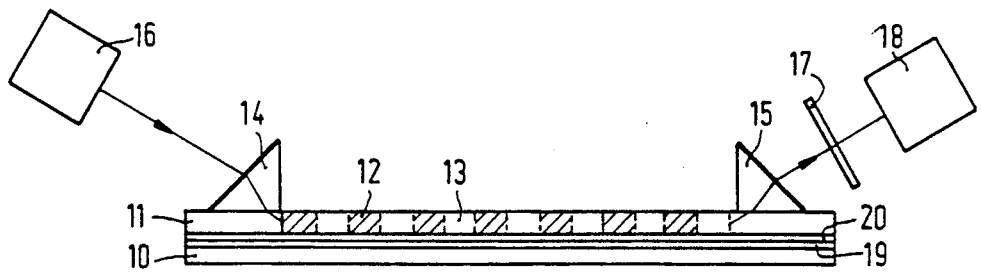

FIG. 1 diagrammatically shows a device in accordance with the invention for doubling the frequency of a light wave. On a substrate 10, for example, of quartz glass, there are provided an electrical conducting layer 19 of a mixture of indium oxide and tin oxide and an optical buffer layer 20 of silicon oxide having a refractive index which is smaller than the refractive index of the non-linear optical medium 11. The non-linear optical medium 11 comprises a uniformly oriented synthetic resin composition having a thickness of 1 μm, preferably a thickness at which the effective refractive index difference between fundamental and second harmonic wavelength does only weakly, or not at all, depend on the layer thickness. Said layer comprises alternate regions 12 having nonlinearly optical properties and neutral regions 13 which are located at regular intervals of the order of 5 to 10 μm. The exact dimensions depend on the wavelengths of the fundamental and second harmonic light waves, and on the various refractive indices at said wavelengths, see for example U.S. Pat. specification U.S. 4865406. Light beams can be coupled in and out by means of glass prisms 14 and 15. Light originating from a laser light source 16, for example a semiconductor laser producing red light, is partly converted into short wave (blue) light. The blue light can be transmitted to an optical device 18 via a filter 17 which is impervious to the red light, in which device the blue light can be used for various purposes or for measuring.

Figure 2:
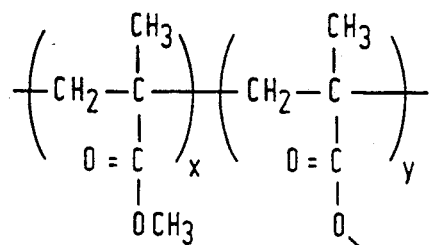
FIG. 2 shows the structural formula of a synthetic resin composition with a non-linear optical component.
Figure 2:
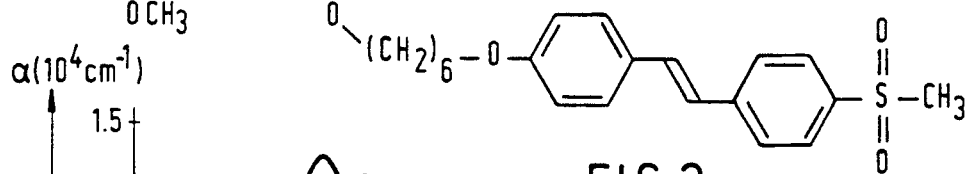

A suitable non-linear optical material comprising a copolymer on the basis of polymethylmethacrylate is MMA/MSMA, the structural formula of which is shown in FIG. 2. In accordance with the exemplary embodiment, a copolymer is used in which the ratio of methylmethacrylate MMA to the nonlinearly optical component MSMA (x : y) has a value of 75:25. A method of manufacturing such a copolymer is described in the non-prepublished European patent application EP 396172, in particular the compound VII described therein, in the present example, the sulfon group being connected to a methyl group instead of to a hexyl group. A thin layer 11 of this copolymer, having a thickness of approximately 1 μm, was manufactured by means of spin coating from a solution in chlorobenzene.

Figure 3:
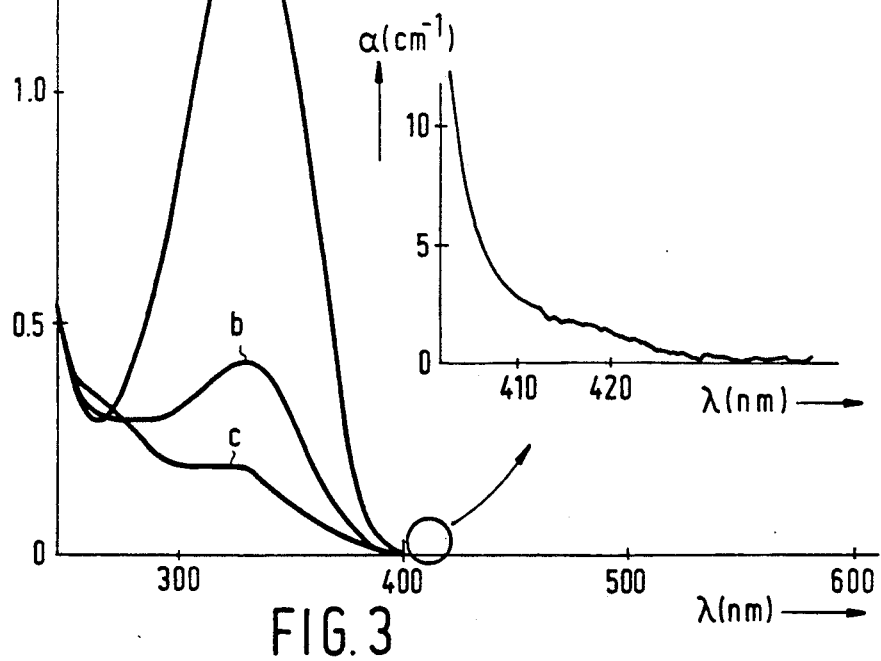
FIG. 3 shows the inverse absorption length $\alpha$ as a function of the wavelength $\lambda$ of a non-linear optical synthetic resin composition.
Figure 4:
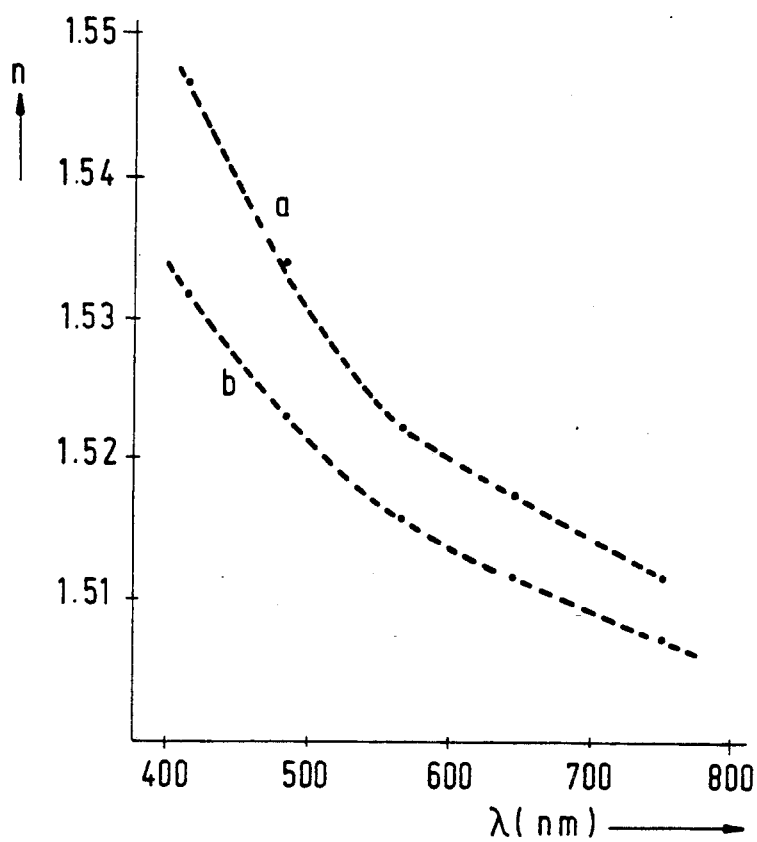

The effects of irradiating (bleaching) this copolymer are shown in FIG. 3 in which curve a and the inset show the absorption of the copolymer which has not been exposed to radiation, curve b shows the absorption after exposure to radiation for 10 minutes and curve c after exposure for 80 minutes with an intensity of 200 mW/cm² at a wavelength of 365 nm. As a result of the exposure to radiation, the non-linear optical component (the MSMA group in the copolymer) is modified such that the optical non-linearity disappears substantially completely. Moreover, the refractive index and the wavelength dispersion of the material decrease, see FIG. 4, in which the refractive index n prior to radiation (curve a) and after radiation for 70 minutes with an intensity of 200 mW/cm² at a wavelength of 365 nm (curve b) is shown. As a result of the exposure to radiation, the refractive index becomes smaller and less dependent on the wavelength. Another important fact is that the absorption at wavelengths of approximately 400 nm (the blue light to be obtained) has a very low value, see the inset of FIG. 3.

A spatial modulation of linear and nonlinear optical properties was provided in the thin film 11 by means of local exposure to radiation. A method which can suitably be used for this purpose is the irradiation of the copolymer layer by an ultraviolet lamp through a lithographic mask. Alternatively, in accordance with the example, a focussed laser beam having a power of 10 mW was moved over the surface at a rate of 200 μm/s by means of a mechanical translator. An ultraviolet argon-ion laser was used for this purpose. Lines having a length of 5 mm were drawn perpendicularly to the direction of travel of the fundamental and second harmonic light waves, the interspace between the lines corresponding to the desired periodicity. Subsequently, the copolymer material was oriented by means of a corona discharge by means of which an electric field was generated which extended (substantially) perpendicularly to the copolymer layer. The order of the steps involved in the patterned irradiation and orientation of the copolymer material is not of essential importance to obtain the desired result.

By virtue of the adapted method, various periodic structures can be manufactured in a simple manner. When a fundamental light wave having a wavelength of 820 nm was used, regions of 7.5 μm of bleached material were alternated with the regions of 5.5 μm of unbleached material in order to obtain phase matching in the material according to the exemplary embodiment. By virtue of the low degree of absorption of the polymer material, a device having a relatively great length of, for example, a few millimeters can be used. In this manner, by using a red input signal of 100 mW a blue output signal having an intensity of 1 mW was obtained.

Figure 5:
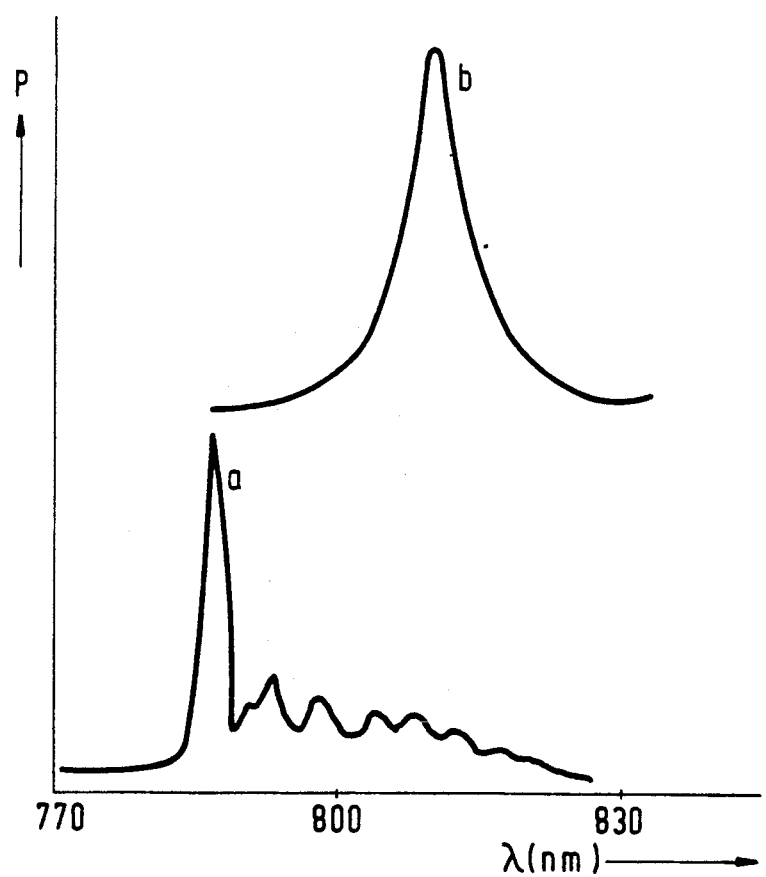
FIG. 5 shows the power P of the second harmonic light wave as a function of the wavelength λ of the fundamental light wave for two different waveguides.

In a subsequent experiment, bleached segments having a fixed length of 1.2 μm were manufactured with a varying value of the periodicity in the waveguide. Light originating from an adjustable dye laser (wavelengths λ of 780 to 850 nm) was applied and the power P of the blue light obtained was measured as a function of the wavelength, see FIG. 5. Curve a shows the result at a periodicity of 11.0 μm, with an optimum frequency doubling in a fundamental light wave having a wavelength of approximately 785 nm. Curve b shows the result at a periodicity of 11.4 μm, the optimum being attained at 815 nm.

The invention permits periodic structures for obtaining phase matching at frequency doubling to be manufactured in a simple manner, which structures can be adapted to the wavelength of the light and the optical properties of the material used.

We claim:

1. A device for doubling the frequency of a light wave comprising a non-linear optical medium of a synthetic resin composition for guiding a fundamental light wave, while forming a second harmonic wave, said medium comprising a waveguide having a spatially periodic structure for phase matching, characterized in that the waveguide is composed of a uniformly oriented synthetic resin composition in which alternately areas having a mutually different second order susceptibility are present in accordance with the desired spatially periodic structure.

2. The device as claimed in claim 1, wherein the synthetic resin composition comprises a copolymer of MMA/MSMA.

3. The device as claimed in claim 2, wherein the ratio of MMA to MSMA is 75/25.

4. A method of manufacturing a device for doubling the frequency of a light wave, which device comprises a waveguide of a synthetic resin composition, said waveguide exhibiting a spatially periodic structure for phase matching, wherein the method comprises the steps of providing a uniformly oriented synthetic resin composition having a non-linear optical component and locally modifying, in accordance with the desired spatial periodic structure, said resin composition such that the second order of susceptibility is changed.

5. A method as claimed in claim 4, characterized in that the local modification is carved out by means of patterned irradiation.

* * * * *